US012713391B2

(12) United States Patent
Keshavamurthy et al.

(10) Patent No.: US 12,713,391 B2
(45) Date of Patent: Aug. 18, 2026

(54) SIDELINK POSITIONING

(71) Applicant: Nokia Technologies Oy, Espoo (FI)

(72) Inventors: Prajwal Keshavamurthy, Munich (DE); Oana-Elena Barbu, Aalborg (DK); Knud Knudsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 243 days.

(21) Appl. No.: 18/497,489

(22) Filed: Oct. 30, 2023

(65) Prior Publication Data

US 2024/0155554 A1 May 9, 2024

(30) Foreign Application Priority Data

Nov. 3, 2022 (GB) ..................................... 2216362

(51) Int. Cl.
*H04W 68/00* (2009.01)
*H04W 76/28* (2018.01)

(52) U.S. Cl.
CPC ........... *H04W 68/00* (2013.01); *H04W 76/28* (2018.02)

(58) Field of Classification Search
CPC .............................. H04W 68/00; H04W 76/28
USPC ....................................................... 455/456.1
See application file for complete search history.

(56) References Cited

U.S. PATENT DOCUMENTS

2017/0212206 A1* 7/2017 Kim ...................... G01S 5/0205
2020/0186990 A1* 6/2020 Jacobs .................. H04W 12/72
2021/0297206 A1 9/2021 Manolakos et al.
2021/0377906 A1* 12/2021 Bao ....................... G01S 5/0205
2022/0022279 A1* 1/2022 Kim ...................... H04W 72/23
2022/0174781 A1 6/2022 Yang et al.
2022/0312326 A1 9/2022 Wu et al.
2024/0057014 A1* 2/2024 Stark ....................... H04L 67/52
2024/0118370 A1* 4/2024 Duan .................... G01S 5/0242
2024/0397470 A1* 11/2024 Hu ........................ G01S 5/0205
2024/0422721 A1* 12/2024 Yue ....................... G01S 13/765
2025/0031146 A1* 1/2025 Manolakos ............. H04L 5/005
2025/0088967 A1* 3/2025 Manolakos ....... H04W 52/0216
2025/0164599 A1* 5/2025 Wang ...................... H04W 4/02
2025/0184890 A1* 6/2025 Rao ................... H04W 28/0221
2025/0203568 A1* 6/2025 Zhang ..................... H04W 4/70

FOREIGN PATENT DOCUMENTS

EP 4047999 A1 8/2022
WO 2021/119474 A1 6/2021
WO 2021/147011 A1 7/2021

(Continued)

OTHER PUBLICATIONS

"Revised SID on Study on expanded and improved NR positioning", 3GPP TSG RAN Meeting #94e, RP-213588, Agenda Item: 8.6.1, Intel, Dec. 6-17, 2021, 6 pages.

(Continued)

*Primary Examiner* — Mark G. Pannell
(74) *Attorney, Agent, or Firm* — Barta Jones, PLLC

(57) ABSTRACT

Examples of the disclosure relate to sidelink positioning. In examples of the disclosure a UE is configured to determine Discontinuous Reception (DRX) assistance information for sidelink positioning. The DRX assistance information comprises information indicative of a DRX configuration information for one or more target UEs. The UE can then enable transmission of the DRX assistance information to one or more candidate anchor UEs.

8 Claims, 8 Drawing Sheets

(56) References Cited

FOREIGN PATENT DOCUMENTS

| | | | |
|---|---|---|---|
| WO | 2022/152635 | A1 | 7/2022 |
| WO | 2022/199489 | A1 | 9/2022 |
| WO | 2022/200674 | A1 | 9/2022 |
| WO | 2023/049591 | A1 | 3/2023 |

OTHER PUBLICATIONS

"3rd Generation Partnership Project; Technical Specification Group Radio Access Network; Study on scenarios and requirements of in coverage, partial coverage, and out of-coverage NR positioning use cases (Release 17)", 3GPP TR 38.845, V17.0.0, Sep. 2021, pp. 1-16.
"3rd Generation Partnership Project; Technical Specification Group Services and System Aspects; Service requirements for the 5G system; Stage 1 (Release 18)", 3GPP TS 22.261, V18.6.1, Jun. 2022, 114 pages.
"3rd Generation Partnership Project; Technical Specification Group Services and System Aspects; Service requirements for cyber physical control applications in vertical domains; Stage 1 (Release 18)", 3GPP TS 22.104, V18.3.0, Dec. 2021, pp. 1-101.
"3rd Generation Partnership Project; Technical Specification Group Services and System Aspects; Study on Ranging-based Services (Release 18)", 3GPP TR 22.855, V18.0.1, Jun. 2021, pp. 1-54.
United Kingdom Application No. 2216370.3, "Sidelink Positioning", filed on Nov. 3, 2022, pp. 1-36.
"3rd Generation Partnership Project; Technical Specification Group Radio Access Network; NR; NR and NG-RAN Overall Description; Stage 2 (Release 17)", 3GPP TS 38.300, V17.1.0, Jun. 2022, pp. 1-209.
"3rd Generation Partnership Project; Technical Specification Group Radio Access Network; Study on Expanded and Improved NR Positioning; (Release 18)", 3GPP TR 38.859, V0.1.0, Aug. 2022, pp. 1-45.
"3rd Generation Partnership Project; Technical Specification Group Radio Access Network; NR; Medium Access Control (MAC) protocol specification (Release 17)", 3GPP TS 38.321, V17.1.0, Jun. 2022, pp. 1-241.
"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.
"Stage 2 Running CR of TS 38.300 for eSL", 3GPP TSG-RAN WG2 Meeting #115 Electronic, R2-2108496, InterDigital, Aug. 2021, 13 pages.
"Corrections for SL enhancements", 3GPP TSG-RAN WG2 Meeting #118-e, R2-2206378, Huawei, May 9-20, 2022, pp. 1-1139.
Search Report received for corresponding United Kingdom Patent Application No. 2216362.0, dated May 3, 2023, 4 pages.
"Discussion on Sidelink Drx", 3GPP TSG-RAN WG2 Meeting #112 electronic, R2-2009026, Agenda Item: 8.15.2, ZTE Corporation, Nov. 2-13, 2020, 6 pages.
"Protocol and coverage aspects of sidelink positioning", 3GPP TSG-RAN WG2 Meeting #120, R2-2212112, Agenda item: 8.2.2, Nokia, Nov. 14-18, 2022, 3 pages.
Partial European Search Report received for corresponding European Patent Application No. 23198821.3, dated Feb. 13, 2024, 11 pages.
Extended European Search Report received for corresponding European Patent Application No. 23198821.3, dated May 15, 2024, 11 pages.

* cited by examiner

SIDELINK POSITIONING

TECHNOLOGICAL FIELD

Examples of the disclosure relate to sidelink positioning. Some relate to sidelink positioning using discontinuous reception (DRX).

BACKGROUND

Sidelink positioning enables terminal devices to perform positioning procedures with other terminal devices without a participation of a base station in the messages. In such procedures some terminal devices will act as anchor devices and some will act as target devices.

BRIEF SUMMARY

According to various, but not necessarily all, examples of the disclosure, there may be provided a UE comprising:

at least one processor; and at least one memory storing instructions, that when executed by the at least one processor, cause the UE at least to perform:

determining Discontinuous Reception (DRX) assistance information for sidelink positioning wherein the DRX assistance information comprises information indicative of a DRX configuration information for one or more target UEs; and enabling transmission of the DRX assistance information to one or more candidate anchor UEs.

The processor and memory may be configured to perform enabling participation as an anchor UE in a sidelink positioning session with one or more target UEs.

The DRX assistance information may be determined from at least one of:

information about a target UE type;

preferences of target UEs about the DRX configuration;

DRX configuration of a target UE; or

DRX configuration of the UE.

The information about a target UE type or preferences of target UEs about the DRX configuration may be determined based on at least one of: a side link positioning request from a target UE, DRX configuration preference indication by a target UE.

The information indicative of a DRX configuration information for one or more of the target UEs may comprises at least one of: a type of the one or more target UEs, a DRX configuration used in a sidelink positioning session with the target UEs, or a class of DRX configurations of the target UEs.

The processor and memory may be configured to perform determining whether to enable transmission of the DRX assistance information.

The determination as to whether to enable transmission of the DRX assistance information may be made based on at least one of:

number of candidate anchors in the vicinity;

whether a request for DRX assistance information has been received; or location of candidate anchor UEs requesting the DRX assistance information.

The DRX assistance information may be associated with a given area.

The processor and memory may be configured to perform enabling the transmission of the DRX assistance information to the one or more candidate anchor UEs based on determining that the one or more candidate UEs are entering the given area or have entered the given area.

The processor and memory may be configured to perform receiving a request for the DRX assistance information from the candidate anchor UE.

The processor and memory may be configured to perform transmitting the DRX assistance information based on the received request.

According to various, but not necessarily all, examples of the disclosure, there may be provided a method comprising:

determining Discontinuous Reception (DRX) assistance information for sidelink positioning wherein the DRX assistance information comprises information indicative of a DRX configuration information for one or more target UEs; and enabling transmission of the DRX assistance information to one or more candidate anchor UEs.

According to various, but not necessarily all, examples of the disclosure, there may be provided a computer program comprising instructions which, when executed by an apparatus, cause a UE to perform at least:

determining Discontinuous Reception (DRX) assistance information for sidelink positioning wherein the DRX assistance information comprises information indicative of a DRX configuration information for one or more target UEs; and enabling transmission of the DRX assistance information to one or more candidate anchor UEs.

According to various, but not necessarily all, examples of the disclosure, there may be provided a UE comprising means for:

determining Discontinuous Reception (DRX) assistance information for sidelink positioning wherein the DRX assistance information comprises information indicative of a DRX configuration information for one or more target UEs; and enabling transmission of the DRX assistance information to one or more candidate anchor UEs.

According to various, but not necessarily all, examples of the disclosure, there may be provided a candidate anchor UE comprising:

at least one processor; and at least one memory storing instructions, that when executed by the at least one processor, cause the UE at least to perform:

receiving Discontinuous Reception (DRX) assistance information for sidelink positioning wherein the DRX assistance information is received from another UE and the DRX assistance information comprises information indicative of a DRX configuration information for one or more target UEs.

The another UE may be participating or may have participated in a sidelink positioning session with the one or more target UEs.

The processor and memory may be configured to perform participating, as an anchor UE, in a sidelink positioning session with the one or more target UEs.

The processor and memory may be configured to perform determining, based on the information indicative of a DRX configuration information, a DRX configuration to be used in a sidelink positioning session with the one or more target UEs.

The processor and memory may be configured to perform using a DRX configuration indicated in the DRX assistance information to participate, as an anchor UE, in the sidelink positioning session with the one or more target UEs.

The processor and memory may be configured to perform adapting current DRX configuration used for sidelink positioning based on the received DRX assistance information.

Adapting current DRX configuration may comprise at least one of:

replacing current DRX configuration with the DRX configuration indicated in the DRX assistance information;

relaxing the current DRX configuration; or increasing the stringency of the current DRX configuration.

The information indicative of a DRX configuration information for one or more of the target UEs may comprise at least one of:

a type of one or more of the target UEs;

a DRX configuration used in the sidelink positioning session with the target UEs; or a class of DRX configurations of the target UEs.

The information indicative of a DRX configuration information for one or more of the UEs may comprise at least the type of the one or more target UEs, wherein the means are for:

determining a DRX configuration to be used in a sidelink positioning session with the one or more target UEs based on the type of the one or more target UEs.

The processor and memory may be configured to perform enabling a request for DRX assistance information to be transmitted from the candidate anchor UE to another UE.

The request for DRX assistance information may comprise at least one of:

current DRX configuration of the UE;

mobility pattern of the UE;

DRX configuration to be used for a response; or

DRX configurations that the UE can support.

The processor and memory may be configured to perform selecting a DRX configuration for sidelink positioning session based on receiving DRX assistance information from multiple anchor UEs.

According to various, but not necessarily all, examples of the disclosure, there may be provided a method comprising:

receiving Discontinuous Reception (DRX) assistance information for sidelink positioning wherein the DRX assistance information is received from another UE and the DRX assistance information comprises information indicative of a DRX configuration information for one or more target UEs.

According to various, but not necessarily all, examples of the disclosure, there may be provided a computer program comprising instructions which, when executed by an apparatus, cause a UE to perform at least:

receiving Discontinuous Reception (DRX) assistance information for sidelink positioning wherein the DRX assistance information is received from another UE and the DRX assistance information comprises information indicative of a DRX configuration information for one or more target UEs.

According to various, but not necessarily all, examples of the disclosure, there may be provided a candidate anchor UE comprising means for:

receiving Discontinuous Reception (DRX) assistance information for sidelink positioning wherein the DRX assistance information is received from another UE and the DRX assistance information comprises information indicative of a DRX configuration information for one or more target UEs.

According to various, but not necessarily all, examples of the disclosure, there may be provided a target User Equipment (UE) comprising:

at least one processor; and at least one memory storing instructions, that when executed by the at least one processor, cause the UE at least to perform:

participating as a target UE in a side link positioning session with a first anchor UE using a Discontinuous Reception (DRX) configuration; and continuing the side-link positioning session with a second anchor UE using the same DRX configuration.

According to various, but not necessarily all, examples of the disclosure, there may be provided a target User Equipment (UE) comprising means for:

participating as a target UE in a side link positioning session with a first anchor UE using a Discontinuous Reception (DRX) configuration; and continuing the side-link positioning session with a second anchor UE using the same DRX configuration.

According to various, but not necessarily all, examples of the disclosure, there may be provided a system comprising:

at least one target User Equipment (UE) comprising means for determining Discontinuous Reception (DRX) assistance information for sidelink positioning wherein the DRX assistance information comprises information indicative of a DRX configuration information for one or more target UEs; and enabling transmission of the DRX assistance information to one or more candidate anchor UEs; and at least one candidate anchor UE comprising means for receiving the DRX assistance information.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
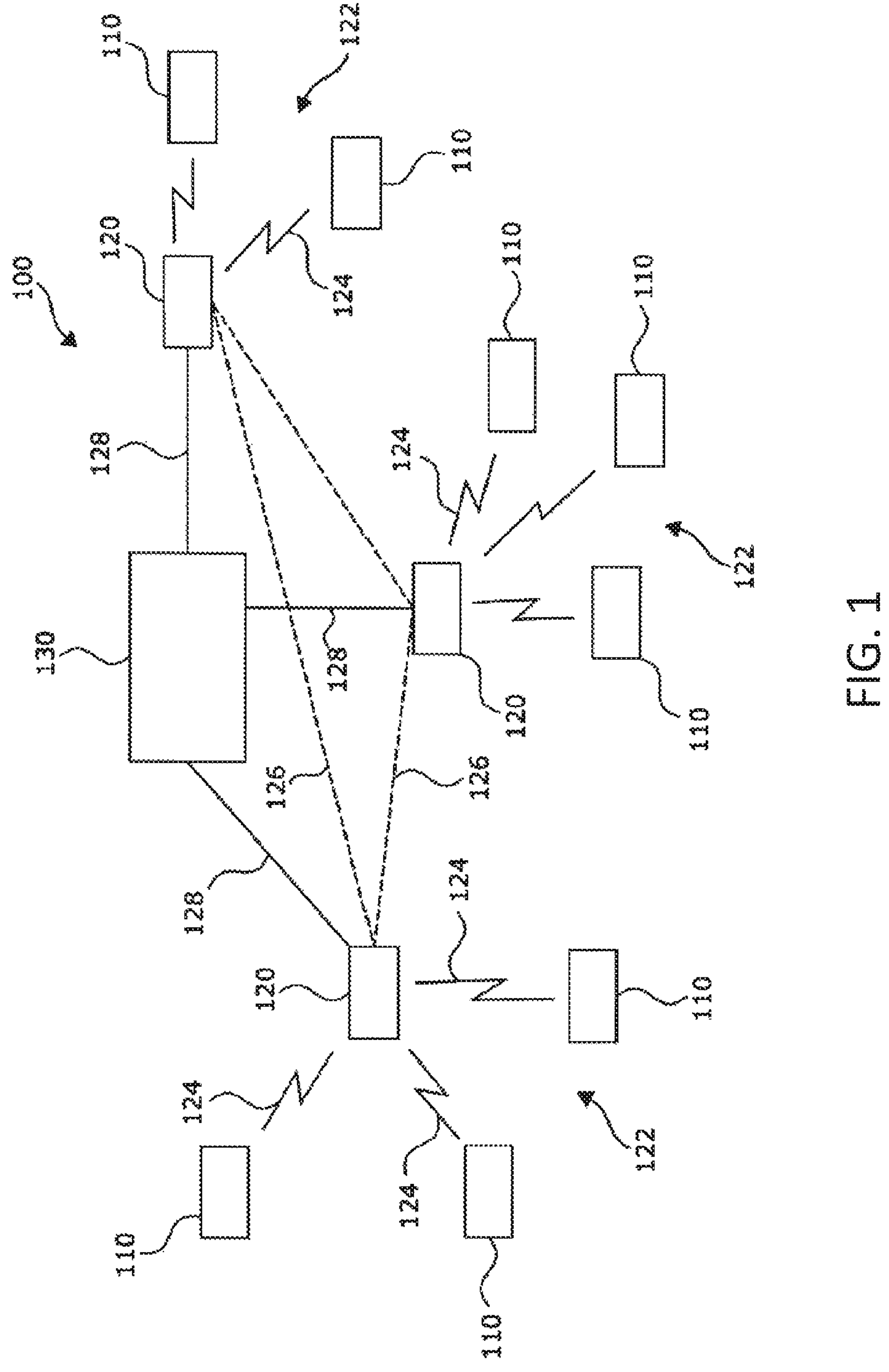
FIG. 1 shows an example network.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

Definitions

AMF Access and Mobility Function
AoD Angle of Departure
AS Access stratum
DL Downlink
DRX Discontinuous Reception
gNB NR base station
HARQ Hybrid Automatic Repeat Request
ID Identification
IIOT Industrial Internet of Things
L2 Layer 2
LDPC Low Density Parity Check
LPHAP Low Power High Accuracy Positioning
NR New Radio
OPDM Orthogonal Frequency-Division Multiplexing
O-RAN Open-Radio Access Network
PSSCH Physical Sidelink Control Channel
QAM Quadrature Amplitude Modulation
QoS Quality of Service
RAN Radio Access Network
RedCap Reduced Capacity
RRC Radio Resource Control
RTT Round Trip Time
SCI Sidelink Control Information
SL Sidelink
SL PRS Sidelink Positioning Reference Signal
UE User Equipment
UL Uplink
WUS Wake-up signal

DETAILED DESCRIPTION

FIG. 1 illustrates an example of a network 100 comprising a plurality of network entities including terminal devices 110, nodes 120 and one or more network devices 130. The terminal devices 110 and nodes 120 communicate with each other. The one or more network devices 130 communicate with the access nodes 120. In some examples the one or more network devices 130 communicate with the terminal devices 110.

The one or more network devices 130 can, in some examples, communicate with each other. The one or more nodes 120 can, in some examples, communicate with each other. The one or more terminal devices 110 can, in some examples, communicate with each other.

The network 100 can be a cellular network comprising a plurality of cells 122 each served by a node 120 or plurality of nodes 120. In this example, the interface between the terminal device 110 and a node 120 defining a cell 122 is a wireless interface 124.

The node 120 comprises one or more cellular radio transceivers. The terminal device 110 comprises one or more cellular radio transceivers.

In the example illustrated the cellular network 100 is a third generation Partnership Project (3GPP) network in which the terminal device 110 are user equipment (UE) and the nodes 120 can be access nodes such as base stations.

The term 'user equipment' is used to designate mobile equipment comprising a smart card for authentication/encryption etc such as a Subscriber Identity Module (SIM). In some examples the term 'user equipment' is used to designate mobile equipment comprising circuitry embedded as part of the user equipment for authentication/encryption such as software SIM. Some examples of a user equipment include a mobile station (mobile phone), smartphone, personal digital assistant (PDA), handset, device using a wireless modem (alarm or measurement device, etc.), laptop and/or touch screen computer, tablet, game console, notebook, smart glasses, and multimedia device.

The nodes 120 can be any suitable base station. A base station is an access node. It can be a network element responsible for radio transmission and reception in one or more cells to or from the terminal device 110. The node 120 can be a network element in a Radio Access Network (RAN), an Open-Radio Access Network (O-RAN) or any other suitable type of network.

The network device 130 can be part of a core network. The network device 130 can be configured to manage functions relating to connectivity for the terminal devices 110. For example, the network device 130 can be configured to manage functions such as connectivity, mobility, authentication, authorization and/or other suitable functions. In some examples the network device 130 can comprise an Access and Mobility management Function (AMF) and/or a User Plane Function (UPF) or any other suitable entities.

In the example of FIG. 1 the network device 130 is shown as a single entity. In some examples the network device 130 could be distributed across a plurality of entities. For example, the network devices 130 could be cloud based or distributed in any other suitable manner The network 100 can be a 4G or 5G network, for example. It can for example be a New Radio (NR) network that uses gNB or eNB as access nodes 120. New Radio is the 3GPP name for 5G technology. In such cases the node 120 can comprise gNodeBs (gNBs) 120 configured to provide user plane and control plane protocol terminations towards the UEs 110 and/or to perform any other suitable functions. The gNBs 120 are interconnected with each other by means of an X2/Xn interface 126. The gNBs are also connected by means of the N2 interface 128 to the network device 130. The gNBs can be connected to an AMF or any other suitable network device 130. Other types of networks and interfaces could be used in other examples. Other types of network could comprise next generation mobile and communication network, for example, a 6G network.

The network 100 can also support sidelink (SL) communications. The SL communications can comprise direct communication between two UEs 110 with or without the participation of a gNB 120 in the transmission and reception of signals. The SL could be used for sidelink positioning.

Figure 2:
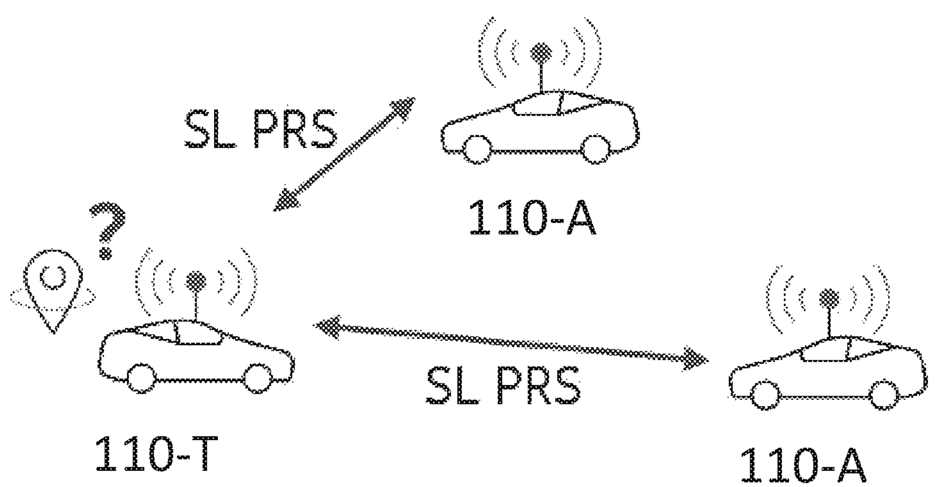
FIG. 2 shows sidelink positioning.

FIG. 2 shows an example of a SL positioning scenario. FIG. 2 shows a target UE 110-T a first anchor UE 110-A, and a second anchor UE 110-A.

In this example the UEs 110 comprise vehicles or devices connected to vehicles. Other types of UEs 110 could be used in other examples.

In the SL positioning scenario, the target UE 110-T is a UE 110 that is to be positioned and an anchor UE 110-A is a UE 110 that can support the positioning of a target UE 110-T. The anchor UE 110-A can support the positioning of the target UE 110-T by transmitting and/or receiving refence signals over an SL interface. In the example of FIG. 2 one target UE 110-T and two anchor UEs 110-A, 110-A are shown. Other numbers of the respective UEs 110 could be used in other scenarios. The SL positioning is similar to Uplink/Downlink (UL/DL) positioning where gNBs 120 serving as anchors transmit/receive reference signals to/from target UEs 110 for positioning.

Any suitable procedure can be used to enable the SL positioning. In some examples a Sidelink Positioning Reference Signal (SL PRS) can be transmitted from the respective anchor UEs 110-A, 110-A and received by the target UE 110-T. Such case may generally be referred to as downlink sidelink positioning. In another example, target UE 110-T transmits SL PRS which is received by the anchor UEs 110-A, 110-A. Such case may generally be referred to as uplink sidelink positioning. In a further example there can be SL PRS exchange between the anchor UEs 110-A, and the target UE 110-T during an SL session. Thus, combination of downlink and uplink positioning may be utilized in positioning the target UE 110-T or other target device. Device or devices measuring the sidelink PRS transmission, may provide measurement result(s) to a network element, such as network element (e.g., location server or location management function (LMF)), wherein the measurement result(s) may be utilized, by the network element, to determine position of the target device. In another example, the measurement result(s) may be utilized, by the device performing the measurement, to determine position of the target device. The measurement result(s) may comprise at least one of time of arrival (ToA), angle of arrival (AoA), signal strength, or some other measurement used to determine the position of the target terminal device. The SL positioning can be enabled with precise latency and accuracy requirements of the corresponding SL session.

In the SL positioning scenario shown in FIG. 2 the target UE 110-T is performing an SL positioning session. In the SL positioning session the target UE 110-T exchanges SL-PRS with two anchor UEs 110-A, in order to determine the location of the target UE 110-T. In this scenario the anchor UEs 110-A, are said to provide SL-PRS assistance to the target UE 110-T.

To reduce power consumption Discontinuous Reception (DRX) can be used for a SL communication session. DRX cycles having DRX ON and DRX OFF configuration can be defined for the SL sessions. For example, a UE 110 can turn off their radio components during a DRX OFF duration to save power, or UE 110 can be configured to not receive or transmit sidelink signals on DRX OFF duration. In the latter case, the UE 110 may still receive and/or transmit Uu related signals (i.e., signals between the UE 110 and access nodes) during DRX OFF duration.

SL communication sessions can support timer-based SL DRX for unicast, groupcast and broadcast signals. Parameters such as on-duration, inactivity timer, retransmission-timer, cycle and any other suitable parameter can be defined for SL DRX to determine the SL active time for SL DRX.

During the SL active time for SL DRX, the receiving UE 110 performs monitoring of Sidelink Control Information (SCI) for data reception. For example, the receiving UE 110 monitors Physical Sidelink Control Channel (PSCCH) and second stage SCI on PSSCH. During the SL inactive time for SL DRX, the receiving UE 110 does not perform monitoring of SCI) for data reception. During the inactive time the receiving UE 110 can skip the monitoring of the PSCCH and second stage SCI on PSSCH for data reception.

In this scenario the SL active time of the receiving UE 110 comprises time in which any of its applicable on-duration timer(s), inactivity-timer(s) or retransmission timer(s) (for any of unicast, groupcast, or broadcast) are running.

In cases in which unicast is used, the receiving UE 110 is configured to maintain a set of SL DRX timers for pairs of source/destination identifications (L2 ID) and directions. The receiving UE 110 is configured to start or restart the timers with a value configured for the respective pair of source/destination L2 ID and direction. The DRX configuration between a pair of source/destination L2 IDs and a direction can be negotiated between the transmitting UE 110 and the receiving UE 110 in the Access Stratum (AS) layer.

For DRX configuration of the respective directions, where one UE 110 is transmitting UE 110 and the other is the receiving UE 110, an approach centred around the transmitting UE can be supported whereby:

receiving UE 110 sends assistance information to the transmitting UE using a PCS-Radio Resource Control (RRC) message or any other suitable message the transmitting UE 110 sends the SL DRX configuration to be used by the receiving UE 110 to the receiving UE 110 using RRCReconfigurationSidelink When the transmitting UE 110 is in-coverage and in RRC_CONNECTED mode, the transmitting UE 110 can report the received assistance information to its serving gNB 120 and can obtain the SL DRX configuration to send to the receiving UE 110 in dedicated RRC signalling from the network 100. When the receiving UE 110 is in-coverage and in RRC_CONNECTED mode, the receiving UE 110 can report the received SL DRX configuration to its serving gNB 120.

On-duration timer, inactivity-timer, Hybrid Automatic Repeat Request (HARQ) Round Trip Time (RTT) and retransmission timers are supported in unicast scenarios. SL HARQ RTT timer and SL retransmission timer are maintained for respective SL HARQ processes at the receiving UE 110. The transmitting UE 110 maintains a timer corresponding to the SL inactivity timer in the receiving UE 110 for respective pairs of source/destination L2 ID, and uses the timer as part of the criterion for determining the allowable transmission time for the receiving UE 110.

For groupcast/broadcast, SL DRX can be configured among multiple UEs 110 based on Quality of Service (QoS) profile and L2 ID. On-duration timer, inactivity-timer, HARQ RTT and retransmission timers are supported for groupcast scenarios. On-duration timer is supported for broadcast scenarios. SL HARQ RTT timer and SL retransmission timer are maintained for respective SL HARQ processes at the receiving UE 110. The transmitting UE 110 maintains a timer corresponding to the SL inactivity timer in the receiving UE 110 for respective pairs of source/destination L2 ID, and uses the timer as part of the criterion for determining the allowable time for to the receiving UE 110.

An issue with SL DRX definition is that the broadcast SL DRX configuration cannot be dynamically adapted. Therefore, when applied for SL positioning at an anchor UE 110, SL DRX cannot ensure a fair tradeoff between power saving and SL positioning update rate for all target UEs 110-T. SL positioning requirements (such as accuracy, latency, update rate requirements) span a wide range and respective anchor UEs 110-A might need to support target UEs 110-T with diverse requirements. The anchor UEs 110-A can be configured with shorter DRX sleep cycles in anticipation of target UEs 110-T with stringent SL positioning requirements, however this results in significant power wastage at the anchor UE 110-A, if no such target UEs 110-T are in the vicinity. Conversely, the anchor UE 110-A can be configured with longer DRX sleep cycles to save power, however this might result in the anchor UE110-A not being able to support target UEs 110-T with stringent SL positioning requirements.

Figure 3:
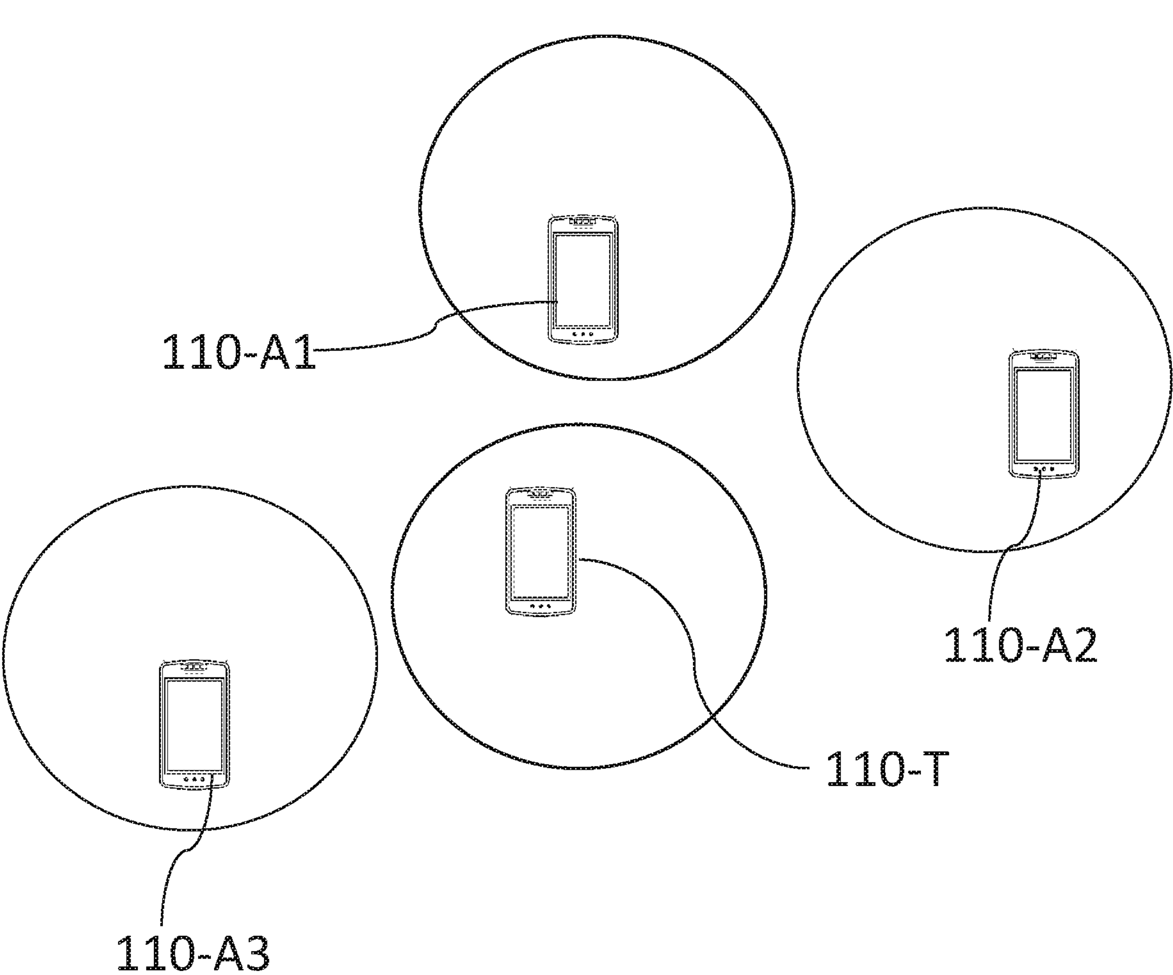
FIG. 3 shows sidelink positioning.

An example of this issues is shown in FIG. 3. FIG. 3 shows an example sidelink positioning scenario.

In this example a target UE 110-T is to be positioned. The target UE 110-T therefore may select and activate a set of anchor UEs 110-A1, 110-A2, 110-A3 with which it should exchange SL PRS.

In the example of FIG. 3 there are three candidate anchor UEs 110-A1, 110-A2, 110-A3 in the region around the target UE 110-T. The different candidate anchor UEs 110-A1, 110-A2, 110-A3 use different SL DRX configurations. In this case the first candidate anchor UE 110-A1 uses a first SL DRX configuration, the second candidate anchor UE 110-A2 uses a second SL DRX configuration, and the third candidate anchor UE 110-A3 uses a third SL DRX configuration. The different SL DRX configurations can have different DRX cycle periods, DRX ON durations or differ in any other suitable manner A first problem that can arise in this scenario is that the target UE 110-T might not be able to find enough candidate anchor UEs 110-A1, 110-A2, 110-A3 for the SL positioning session. This problem can arise because the nearby candidate anchor UEs 110-A1, 110-A2, 110-A3 might have different DRX configurations so that the SL UEs 110 monitor the SL channel with different time patterns.

A second problem that may arise is enabling the SL positioning session to be finalized within a latency target. This problem can arise even if the target UE 110-T has found sufficient candidate anchor UEs 110-A1, 110-A2, 110-A3 with the same DRX configuration for the SL positioning session because the DRX cycle could be too long.

Figure 4:
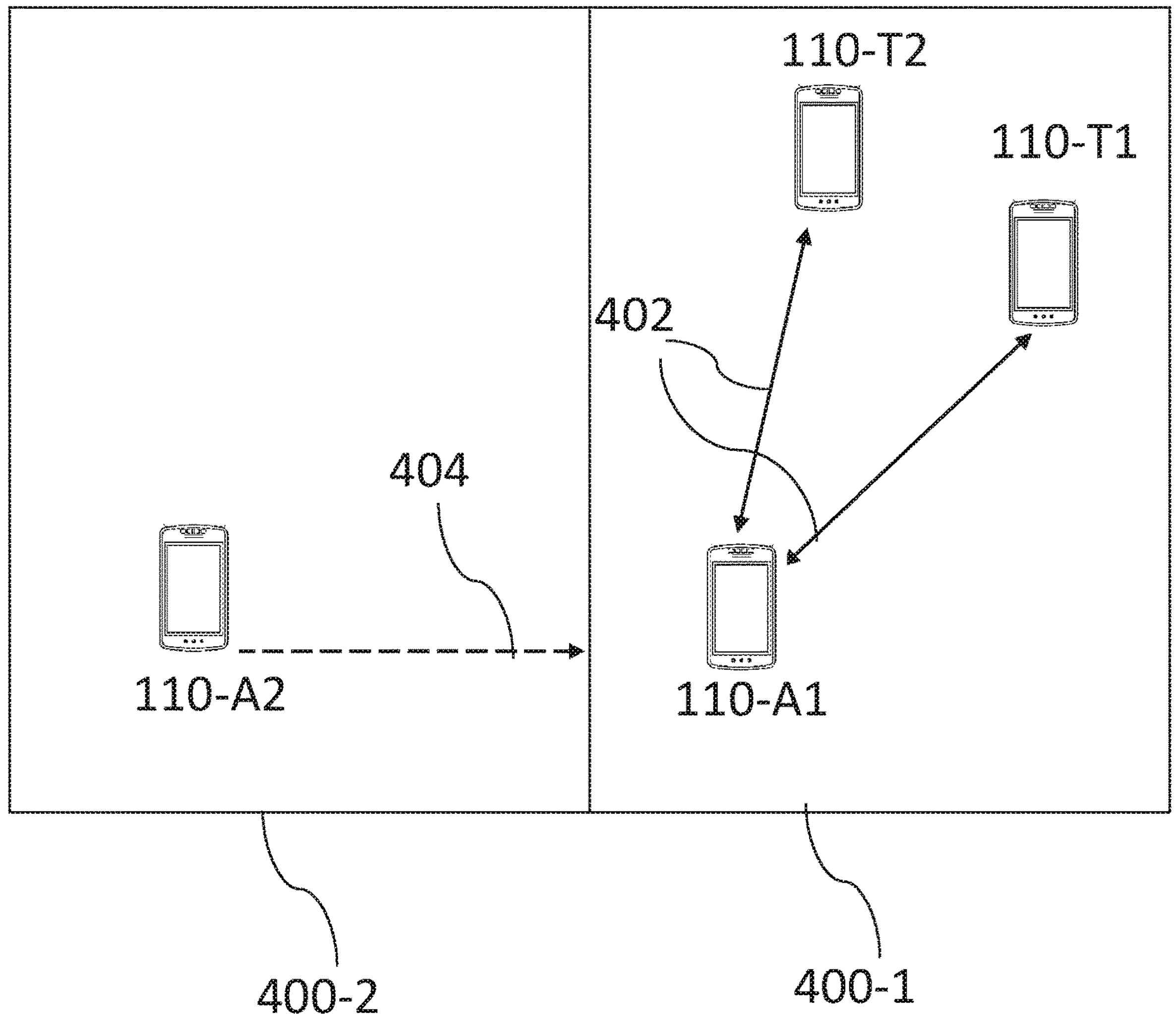
FIG. 4 shows sidelink positioning.

FIG. 4 shows an example sidelink positioning scenario.

The scenario comprises a first zone 400-1 and second zone 400-2. The respective zones 400-1, 400-2 can comprise different geographical areas or zones divided by any suitable criteria. Such zones could be two-dimensional areas and/or three-dimensional areas. Non-limiting examples of a two-dimensional area may be a part of a road or a building. Non-limiting example of a three-dimensional area may be a floor of a building.

A plurality of UEs 110 are located within the respective zones. The UEs 110 can be mobile devices and can move between the respective zones. In the example of FIG. 4 the UEs 110 comprise mobile phones. Other types of UEs 110 could be used in other examples, for instance one or more of the UEs 110 could comprise a vehicle or any other suitable type of UE 110.

In the example of FIG. 4 the anchor UE 110-A1 in the first zone 400-1 is supporting SL positioning for both of the target UEs 110-T1 and 110-T2. To support the SL positioning SL-PRS messages 402 are exchanged between the anchor UE 110-A1 and the respective target UEs 110-T1, 110-T2. It is pointed out that depending on the SL positioning method SL-PRS message could be sent to only one direction (e.g. uplink or downlink). For example in SL time difference of arrival (TDOA) based method the SL-PRS message is only sent in one direction. Transmission in both directions could be used in other SL positioning methods such as SL round-trip transmission (RTT) based methods. To enable the anchor UE 110-A1 to support SL positioning of the target UEs 110-T1, 110-T2 the anchor UE 110-A1 is aware of the positioning requirements of the target UEs 110-T1, 110-T2. The positioning requirements can compromise information about DRX requirements of the target UEs 110-T1, 110-T2, type of the target UEs 110-T1, 110-T2 or any other suitable information. For example, positioning requirements of the target UEs 110-T1, 110-T2 may depend on type of UE. For example, anchor UE 110-A1 may determine position requirement based on type of target UE and preconfigured information, such as a mapping between different device types and positioning requirements.

In the example of FIG. 4 the anchor UE 110-A1 is aware of the positioning requirements of the target UEs 110-T1, 110-T2 because the anchor UE 110-A1 is in a positioning session with the target UEs 110-T1, 110-T2. In other examples the anchor UE 110-A1 could be aware of the positioning requirements of the target UEs 110-T1, 110-T2 without being in a positioning session with the target UEs 110-T1, 110-T2. For instance, the anchor UE 110-A1 could have been made aware of the positioning requirements of the target UEs 110-T1, 110-T2 through an SL positioning session request or by means of UE implementation or by any other suitable means.

The anchor UE 110-A1 is configured to use a DRX configuration for the SL positioning session. The DRX configuration that is used may be selected so that it meets the SL positioning requirements of the respective target UEs 110-T1, 110-T2 and also power saving requirements of the anchor UE 110-A.

In the example shown in FIG. 4 another UE 110 is located within the second zone 400-2. The UE 110 in the second zone 400-2 comprises another anchor UE 110-A2.

In the example of FIG. 4 the another anchor UE 110-A2 is currently located in the second zone 400-2 but is moving into the first zone 400-1. The trajectory of the another anchor UE 110-A2 is indicated by the dashed arrow 404 in FIG. 4.

In the example of FIG. 4 the another anchor UE 110-A2 also has a DRX configuration. However the DRX configuration of the another anchor UE 110-A2 is different to the DRX configuration of the anchor UE-110-A1 in zone-1 400-1. The different DRX configurations could comprise different classes, different sleep cycles (i.e., different ON/OFF periods), or have any other relevant different characteristics.

The DRX configuration of the another anchor UE 110-A2 might not be suitable for use with the target UEs 110-T1, 110-T2 in zone-1. The DRX configuration that is used by the another anchor UE 110-A2 might not provide an adequate balance between the availability of the another anchor UE 110-A2 and power saving. For example the DRX configuration of the another anchor UE 110-A2 could have longer sleep cycles (i.e. longer DRX OFF periods) to increase power saving. However, these long sleep cycles might not enable the another anchor UE 110-A2 to support positioning of the target UEs 110-T1, 110-T2. For examples the long sleep cycles may make the another anchor UE 110-A2 unable to meet the latency requirements that the targets UEs 110-T1, 110-T2 have for SL positioning sessions.

Alternatively, the DRX configuration that is used by the another anchor UE 110-A2 could have shorter sleep cycles in anticipation of target UEs 110-T1, 110-T2 having stringent SL positioning requirements. This can enable the another anchor UE 110-A2 to meet the stringent SL requirements. However, these short sleep cycles have the disadvantage that they can result in significant power wastage by the another anchor UE 110-A2 if there are no target UEs 110-T1, 110-T2 in the vicinity of the another anchor UE 110-A2 or if the target UEs 110-T1, 110-T2 have more lenient SL positioning requirements than expected.

Figure 5:
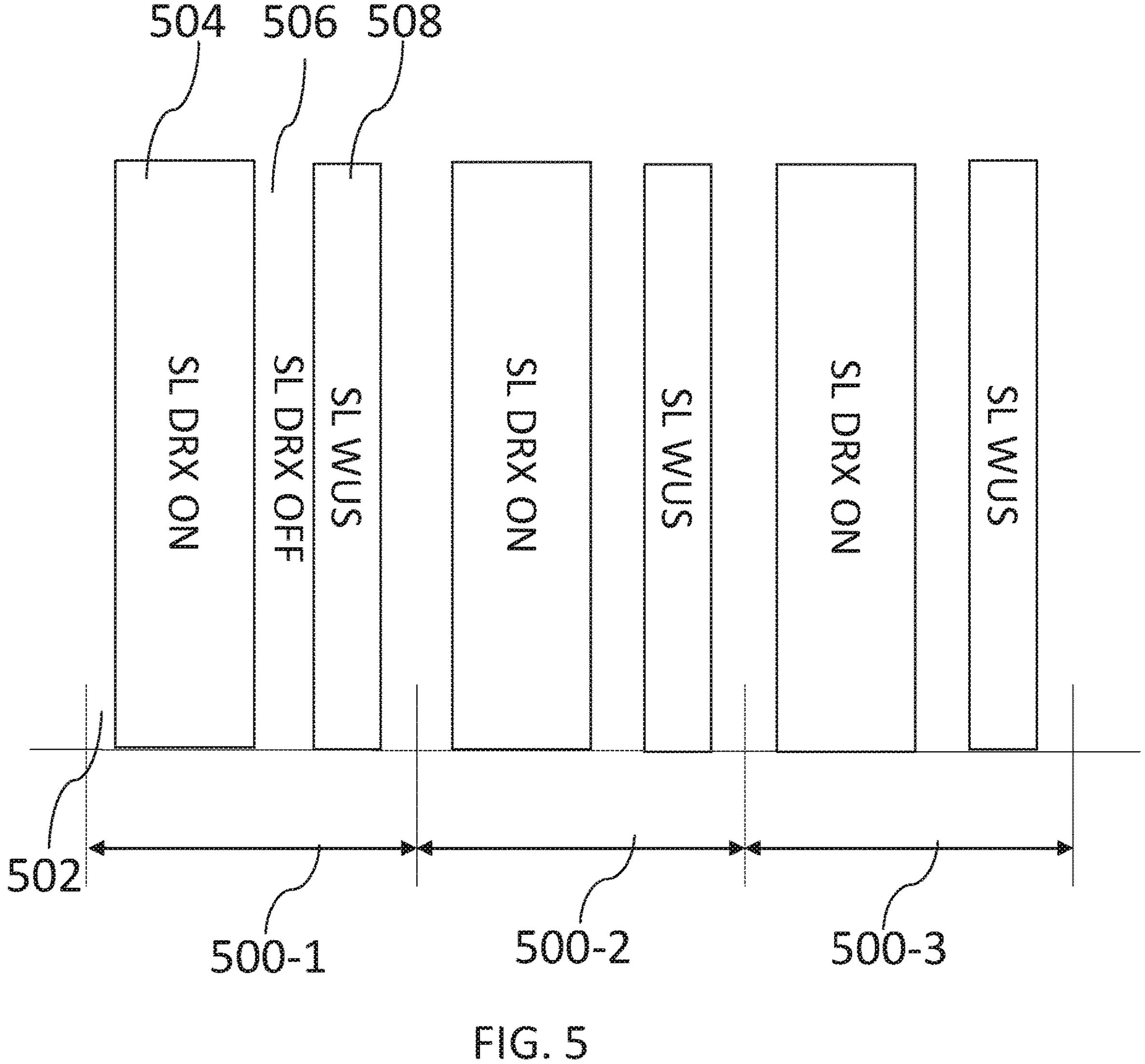
FIG. 5 shows discontinuous reception cycles.

FIG. 5 shows example DRX 500 cycles that could be used by respective UEs 110 in examples of the disclosure.

In this example three DRX cycles 500-1, 500-2, 500-3 are shown. The DRX cycles 500 comprise a DRX start offset 502, an SL DRX ON duration 504, an SL DRX OFF duration 506 and an SL wake-up signal (WUS) occasion 508. For clarity the DRX start offset 502 and the SL DRX OFF duration 506 are only labelled for the first DRX cycle 500-1 in FIG. 5.

During the SL DRX ON duration 504 a UE 110 can turn on their radio components to enable SL positioning or any other exchange of information. During the SL DRX OFF duration 506 a UE 110 can skip monitoring of SCI for data reception to save power.

In the example of FIG. 5 the DRX cycles are configured for SL positioning and comprise an SL WUS occasion 508. The SL WUS occasion 508 comprises a duration in which a wake-up signal can be transmitted from a target UE 110-T (see e.g. target UE 110-T of FIG. 3).

In some examples the wake-up signal that is transmitted at the SL WUS occasion 508 can comprise an indication of a sidelink positioning request. The sidelink positioning request can be for the positioning of the target device 110-T that transmitted the wake-up signal.

The wake-up signal can be transmitted from a target UE 110-T to one or more candidate anchor UEs 110-A. The wake-up signal can comprise a point to multipoint signal.

A wake-up signal can comprise a signature indicative of a DRX configuration or a class of DRX configuration of the UE 110 that transmits the wake-up signal. The signature in the wake-up signal could be a waveform type, a code or any other identifying characteristic. A candidate anchor UE 110-A that has a given DRX configuration or can service target UEs 110-T having a given DRX configuration can detect wake-up signals having the signature indicative of the given DRX configuration.

In some examples DRX classes of the UEs 110 can be defined. The DRX classes can be determined by any suitable parameters or groups of parameters of the DRX configurations or the UEs 110. In some examples a DRX class can have a predefined sleep cycle. In such cases different DRX classes could have different sleep cycles. In some examples the DRX class can be specific to a type of UE 110. In such cases an indication of a type of UE 110 could therefore serve as an indication of a DRX class.

In some examples the supporting of the positioning by the anchor UE 110-A can be based on a DRX class hierarchy. In such cases the DRX class of the target UE 110-T and the DRX class of a candidate anchor UE 110-A can be compared using a hierarchy. This means that the DRX classes of the target UEs 110-T do not need to be the same as the DRX class of the anchor UEs 110-A because the DRX class hierarchy can be used to determine whether the respective classes are compatible.

The hierarchy of DRX classes can be configured in any suitable arrangement. The hierarchy of DRX classes can be configured so that an anchor UE 110-A can serve as anchor for target UEs 110-T of higher or equal classes within the hierarchy. In some examples the hierarchy of DRX classes can be configured such that higher DRX classes have longer sleep durations than lower DRX classes. This means that an anchor UE 110-A can serve as an anchor for further target UEs 110-T that have longer sleep durations.

The class hierarchy enables interactions between UEs 110 having different classes. The class hierarchy is configured so that candidate anchor UE 110-A with a DRX class k monitors for WUSs from target UEs 110-T of class j where j k. the hierarchy of DRX classes can be configured such that higher DRX classes have longer sleep durations than lower DRX classes. This enables a candidate anchor UE 110-A to serve as an anchor for target UEs 110-T having a DRX equal to their own or higher than their own.

The DRX classes that are defined for the SL positioning can be denoted as DRXP classes.

Examples of different DRXP classes could be:

A Reduced Capacity (RedCap) UE obeys a DRXP cycle with pattern DRXP-type-RedCap

A Low Power High Accuracy Positioning (LPHAP) UE obeys a DRXP cycle with pattern DRXP-type-LPHAP

. . . .

All other type UE obeys a DRXP cycle with pattern DRXP-type-Gen.

In this case the general class would be a lower class and the RedCap class would be a higher class. Using the class hierarchy a candidate anchor UE 110-A having DRXP-type-Gen. would be able to service requests from target UEs 110-T having DRXP-type-RedCap or DRXP-type-LPHAP. However, a candidate anchor UE 110-A having DRXP-type-LPHAP would only be able to service requests from target UEs 110-T that also have DRXP-type-LPHAP. Such candidate anchor UEs 110-A would not be able to service requests from target UEs 110-T having DRXP-type-Gen or DRXP-type-LPHAP.

The respective DRX or DRXP classes can be defined so that a UE 110 of class j:

Has an ON duration of on(j) seconds,

Has an OFF duration of off(j) seconds,

May send a WUS with signature(j)—if it needs to become a SL target.

Should listen and attempt to detect all WUS with signature(k), where k>=j.

Therefore:

1. For DRXP class-1, a UE 110 has:
   a. a class-1 specific ON and OFF duration
   b. may perform the transmission of a WUS with signature 1
   c. should listen and attempt to detect the reception of a WUS whose signature is from a list L-class-1={signature 1, signature 2, signature 3, . . . , signature N}.
2. For DRXP class-2, a UE 110 has:
   a. a class-2 specific ON and OFF duration
   b. may perform the transmission of a WUS with signature2
   c. should listen and attempt to detect the reception of WUS whose signature is from a list L-class-2={signature 2, signature 3, . . . , signature N}.
3. . . . .
4. For DRXP class DRXP class-N with a class-N specific ON and OFF duration a UE 110 has:
   a. a class-N specific ON and OFF duration
   b. may perform the transmission of a WUS with signatureN
   c. should listen and attempt to detect the reception of a WUS whose signature is from a list L-class-N={signature N}.

There may be a further definition of classes with respect to the UE types. In such cases the DRX or DRXP class can have an attribute that specifies the UE type(s) associated with the class.

In the example SL scenario shown in FIG. 4 the another anchor UE 110-A2 may not have information on the DRX configuration or the DRX class of the target US 110-T1, 110-T2 in the first zone 400-1. However the anchor UE 110-A1 in the first zone 400-1 does have this information. In examples of the disclosure, the anchor UE 110-A1 in the first zone can share the information about the DRX configuration or the DRX class of the target UE 110-T1, 110-T2 with the another anchor UE 110-A2 to enable the another anchor UE 110-A2 to choose the most appropriate DRX configuration and deploy SL positioning with the target UEs 110-T1, 110-T2.

Figure 6A:
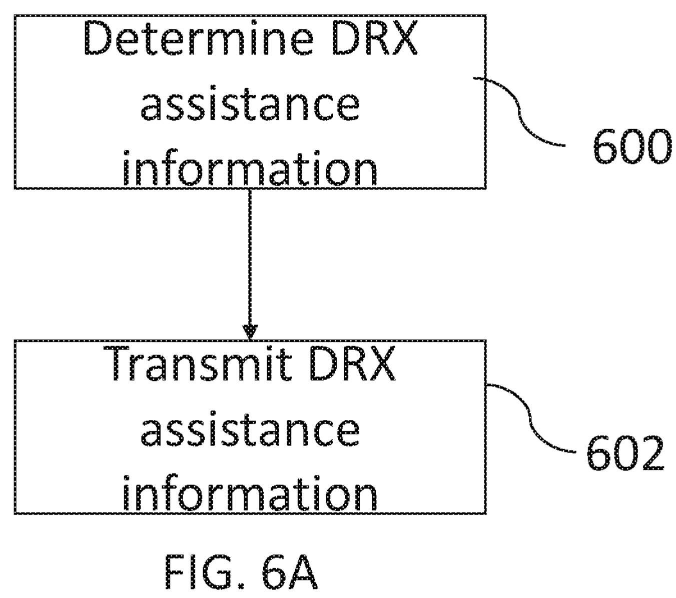
FIGS. 6A to 6C show example methods.
Figure 6B:
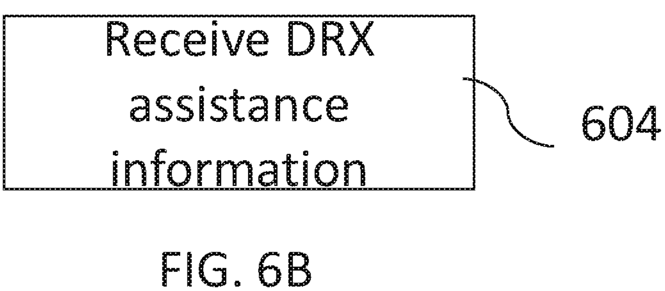
Figure 6C:
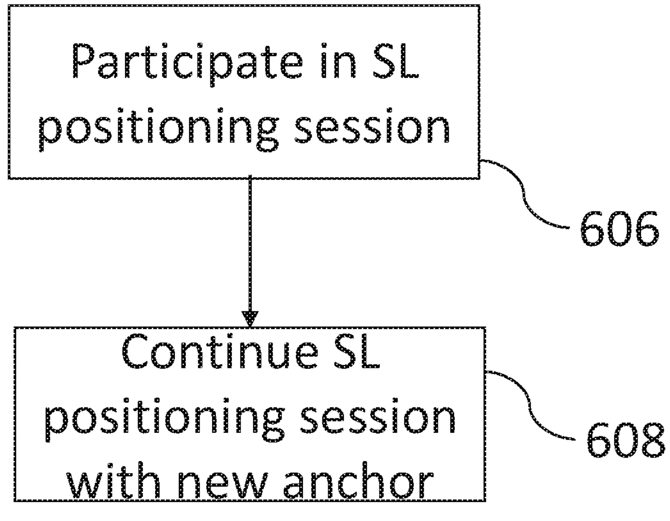

FIGS. 6A to 6C show example methods that could be implemented in examples of the disclosure.

The example method of FIG. 6A can be implemented by a UE 110. The UE 110 can have information about the DRX or DRXP configurations of one or more target UEs 110-T that are to be positioned.

The UE could have candidate anchor capabilities. The UE 110 could be an anchor UE 110-A that is currently in an SL positioning session with one or more target UEs 110-T. The UE 110 could be an anchor UE 110-A1 as shown in FIG. 4. In some examples the UE 110 does not need to be currently in an SL positioning session but could have DRX information relating to one or more target UEs 110-T.

At block 600 the method comprises determining DRX assistance information for SL positioning. The DRX assistance information comprises information indicative of a DRX configuration information for one or more target UEs 110-T. The DRX configuration information could be a DRXP configuration or any other suitable type of DRX information.

The DRX assistance information can be determined from: information about a target UE 110-T type; preferences of target UEs 110-T about the DRX configuration; DRX configuration of a target UE 110-T; DRX configuration of the UE 110-A, or any other suitable source.

The information about a target UE 110-T type or preferences of target UEs 110-T about the DRX configuration can be determined based on: a sidelink positioning request from a target UE 110-T, DRX configuration preference indication by a target UE 110-T or any other suitable information.

The information indicative of a DRX configuration information for one or more of the target UEs 110-T can comprise: a type of the one or more target UEs 110-T, a DRX configuration used in a sidelink positioning session with the target UEs 110-T, and/or a class of DRX configurations of the target UEs 110-T, or any other suitable information.

At block 602 the method comprises enabling transmission of the DRX assistance information to one or more candidate anchor UEs 110-A. The candidate anchor UEs 110-A could be UEs that are moving from a first geographical area into the geographical area in which the target UEs 110-T are located. For example, the candidate anchor UE 110-A could be the another anchor UE 110-A2 as shown in FIG. 4.

In some examples the DRX assistance information can be associated with a given area. The given area can be indicated in the DRX assistance information. The given area could be a zone or a geographical area as shown in FIG. 4 or any other suitable area. The UE 110 can be configured to enable the transmission of the DRX assistance information to the one or more candidate anchor UEs 110-A based on determining that the one or more candidate UEs 110-A are entering the given area or have entered the given area. For example, if a trajectory of a candidate anchor UE 110-A indicates that the candidate anchor UE 110-A will enter the given area then the DRX assistance information can be transmitted to the candidate anchor UE 110-A.

In another example, the candidate anchor UE 110-A may determine, based on entering the given area, to determine DRX configuration as discussed herein. Thus, the candidate anchor 110-A may receive the DRX assistance information outside the given area, and determine the DRX configuration to be used in the given area based on the assistance data when entering the given area. In some examples, the candidate anchor 110-A may determine the DRX configuration when it is about to enter the given area or when it determines that it will enter the given area.

In some examples the method that is performed by the UE 110 can comprise additional blocks that are not shown in FIG. 6A. For instance, in some examples the UE 110 can be configured to determine whether to enable transmission of the DRX assistance information. The determination of whether to enable transmission of the DRX assistance information can be made based on any suitable criteria. For instance, the determination as to whether to enable transmission of the DRX assistance information can be made based on: number of candidate anchor UEs 110-A in the vicinity; whether a request for DRX assistance information has been received; location of candidate anchor UEs 110-A requesting the DRX assistance information; or any other suitable criteria.

In some examples the UE 110 can be configured to receive a request for the DRX assistance information from the candidate anchor UE 110-A. In such cases the UE 110 can be configured to transmit the DRX assistance information based on the received request.

The example method of FIG. 6B can be implemented by a candidate anchor UE 110-A. The candidate anchor UE 110-A does not have information about the DRX or DRXP configurations of one or more target UEs 110-T that are to be positioned. The candidate anchor UE 110-A could be the another anchor UE 110-A2 as shown in FIG. 4.

The method implemented by the candidate anchor UE 110-A comprises, at block 604, receiving DRX assistance information for sidelink positioning. The DRX assistance information is received from another UE 110. The DRX assistance information comprises information indicative of a DRX configuration information for one or more target UEs 110-T.

The DRX assistance information can be received from one or more UEs 110 that are implementing the method of FIG. 6A. The another UE 110 from which the DRX assistance information is received can be participating or can have participated in an SL positioning session with the one or more target UEs 110-T.

The information indicative of a DRX configuration information for one or more of the target UEs 110-T can comprise at least one of: a type of one or more of the target UEs 110-T, a DRX configuration used in the sidelink positioning session with the target UEs 110-T; a class of DRX configurations of the target UEs 110-T or any other suitable information. If the information indicative of a DRX configuration information for one or more of the UEs 110-T comprises the type of the one or more target UEs, the candidate anchor UE 110-A can be configured to determine a DRX configuration to be used in an SL session with the one or more target UEs 110-T based on the type of the one or more target UEs 110-T. So, UE 110-A may determine DRX configuration to be used based on the type of the one or more target UEs indicated by the another UE 110.

The methods that are implemented by the candidate anchor UE 110-A can comprise blocks that are not shown in FIG. 6B. For example, once the DRX assistance information has been received the candidate anchor UE 110-A can be configured to participate, as an anchor UE 110-A, in an SL positioning session with the one or more target UEs. The candidate anchor UE 110-A can be configured to determine, based on the information indicative of a DRX configuration information, a DRX configuration to be used in a sidelink positioning session with the one or more target UEs. A DRX configuration indicated in the DRX assistance information can be used by the candidate anchor UE 110-A to participate, as an anchor UE 110-A, in the SL Positioning session with the one or more target UEs 110-T.

In some examples the candidate anchor UE 110-A can be configured to adapt a current DRX configuration used for SL positioning based on the received DRX assistance information. The DRX configuration used for SL positioning can also be referred to as an SL positioning DRX configuration.

The adapting of the current DRX configuration can comprise: replacing current DRX configuration with the DRX configuration indicated in the DRX assistance information; relaxing the current DRX configuration; or increasing the stringency of the current DRX configuration or any other suitable adaptation.

In some examples the candidate anchor UE 110-A can be configured to enable a request for DRX assistance information to be transmitted from the candidate anchor UE 110-A to another UE 110. The request that is transmitted to the another UE 110 could trigger the another UE 110 performing the method of FIG. 6A. The request for DRX assistance information can comprise at least one of: current DRX configuration of the UE; mobility pattern of the UE; DRX configuration to be used for a response; DRX configurations that the UE can support; or any other suitable information.

In some examples the candidate anchor UE 110-A could receive DRX assistance information from multiple anchor UEs 110. In such cases the candidate anchor UE 110-A can be configured to select a DRX configuration for an SL positioning session based on the DRX assistance information received from multiple anchor UEs 110-A. Any suitable criteria can be used for the selection. In some examples the criteria could be power saving requirements or any other suitable criteria.

The example method of FIG. 6C can be implemented by a target UE 110-T. The target UE 110-T can be a UE 110 that is to be positioned.

The method of 6C comprises, at block 606, participating as a target UE 110-T in an SL positioning session with a first anchor UE 110-A1 using a DRX configuration. The method also comprises continuing the SL positioning session with a second anchor UE 110-A2 using the same DRX configuration.

The target UE 110-T could be initially participating in an SL positioning session with a first anchor UE 110-A1 that performs a method as shown in FIG. 6A. After the first anchor UE 110-A1 has shared DRX assistance information with the second anchor UE 110-A2 the target UE 110-T can continue the SL positioning session with the second anchor UE 110-A2. In this case the second anchor UE 110-A2 is a new anchor for the target UE 110-T. For example, the target UE 110-T may determine to continue using the same DRX configuration based on determining that the UE 110-A1 has shared DRX assistance information to the second anchor UE 110-A2. For example, target UE 110-T may receive the DRX assistance information from the UE 110-A1 and determine based on that to continue using the same DRX configuration with the second anchor UE 110-A2.

Figure 7A:
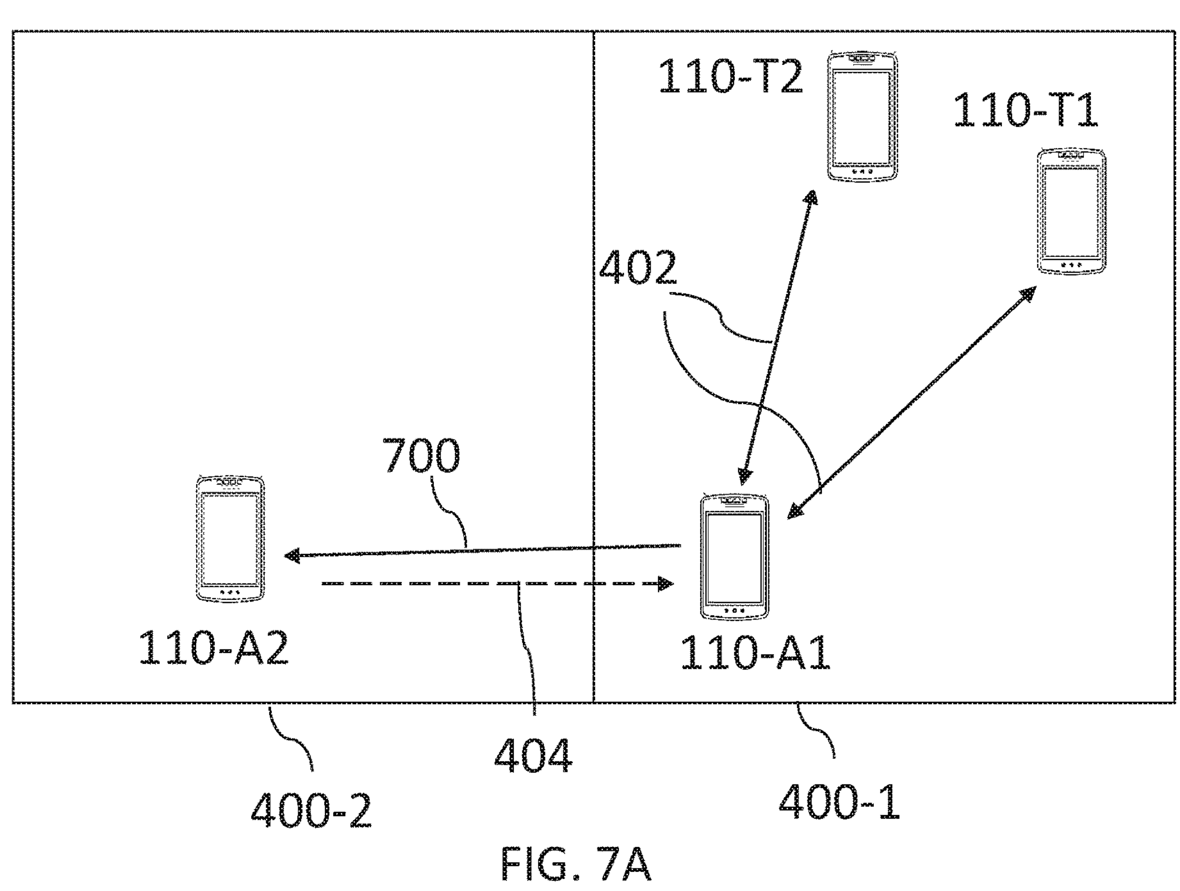
FIGS. 7A to 7B show sidelink positioning.
Figure 7B:
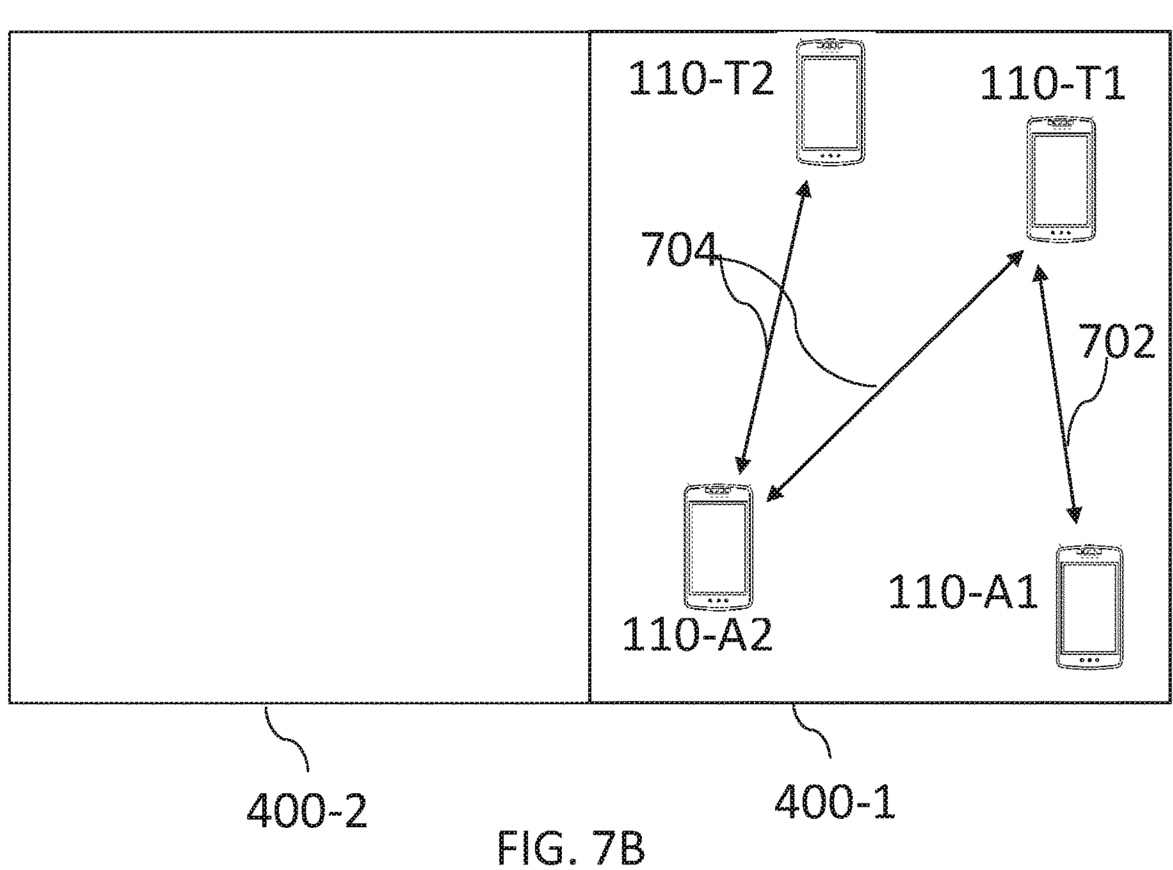

FIGS. 7A to 7B show an SL positioning scenario for examples of the disclosure. FIGS. 7A and 7B show how examples of the disclosure can address the issues indicated in FIG. 4.

The scenario of FIGS. 7A and 7B comprises a first zone 400-1 and second zone 400-2 as shown in FIG. 4.

In the example shown in FIG. 7A the UEs 110 in the first zone 400-1 comprise one anchor UE 110-A1 and two target UEs 110-T1, 110-T2. The anchor UE 110-A1 can be participating in an SL positioning session with the target UEs 110-T1, 110T2 The second zone 400-1 comprises a candidate anchor UE 110-A2 that has a trajectory 404 that indicates that it will shortly enter the first zone 400-1.

In examples of the disclosure the anchor UE 110-A1 can be configured to determine DRX assistance information 700 and enable the DRX assistance information 700 to be transmitted from the anchor UE 110-A1 to the candidate anchor UE 110-A2.

FIG. 7B shows the scenario after the candidate anchor UE 110-A2 has moved from the second zone 400-2 into the first zone 400-1. In this example, the candidate anchor 110-A2 has received the DRX assistance information from the anchor UE 110-A1 and so can select an appropriate DRX configuration for use in an SL positioning session with the target UEs 110-T. The DRX assistance information can be received by the candidate anchor UE 110-A2 before the candidate anchor UE 110-A2 enters the first zone 400-1.

As one example, the DRX assistance information from anchor UE 110-A1 to anchor UE 110-A2 indicates type of the one or more target UEs 110-T. UE 110-A2 may determine, based on the type of the one or more target UEs 110-T, DRX configuration to be used for the SL positioning session with the target UEs 110-T. It is noted that, in some examples, it might not be necessary to indicate any other information than the target UE type or types to the anchor UE 110-A2. In such cases, the anchor UE 110-A2 may determine, based on receiving said information (i.e., UE 110-A2 is in range for receiving said information), that it should start utilizing DRX configuration associated with the indicate target UE type. Moreover, the DRX assistance information may indicate one or more target UE types. For example, anchor UE 110-A1 may determine to indicate type of all target UEs 110-T that it has had or is having a positioning session with. Thus, more than one device type may be indicated depending on the type of the target UEs 110-T. In another example, type of a target UE 110-T that has highest position accuracy requirement is indicated. In this example, anchor UE 110-A1 may indicate only one device type.

In the example, in which more than one device type is indicated, the anchor UE 110-A2 may determine DRX configuration suitable for all device types. It can be assumed that device type 1 associated with a first positioning requirement and device type 2 associated with a second positioning requirement are indicated by the DRX assistance data. The second positioning requirement may require longer or more frequent ON periods than first positioning requirement. Hence, the anchor UE 110-A2 may select DRX configuration based on device type 2 as it may enable the anchor UE 110-A2 to perform positioning session with both device types 1 and 2. For instance, anchor UE 110-A2 may determine a position requirement associated with a certain device type based on pre-configured mapping indicating association between position requirements and device types. Further, as position requirement is determined, the anchor UE 110-A2 may select an appropriate DRX configuration that enables fulfilling the determined positioning requirement.

In the example of FIG. 7B the candidate anchor 110-A2 initiates an SL positioning session by transmitting an SL positioning session request 704 to the respective target UEs 110-T. An appropriate DRX configuration can be used to transmit the SL positioning request based on the DRX assistance information.

The examples of FIGS. 7A and 7B therefore show a first anchor UE 110-A1 participating in an SL positioning session with target UEs 110-T. The first anchor UE 110-A1 can then transmit DRX assistance information relating to the SL positioning session to the candidate anchor UE 110-A2. The candidate anchor UE 110-A2 can then use the DRX assistance information to participate in an SL positioning session with one or more of the target UEs 110-T that were participating in the SL positioning session with the first anchor UE 110-A1. The target UEs 110-T can start an SL positioning session with a first anchor UE 110-A1 and continue the SL positioning session with another anchor UE 110-A2.

Figure 8:
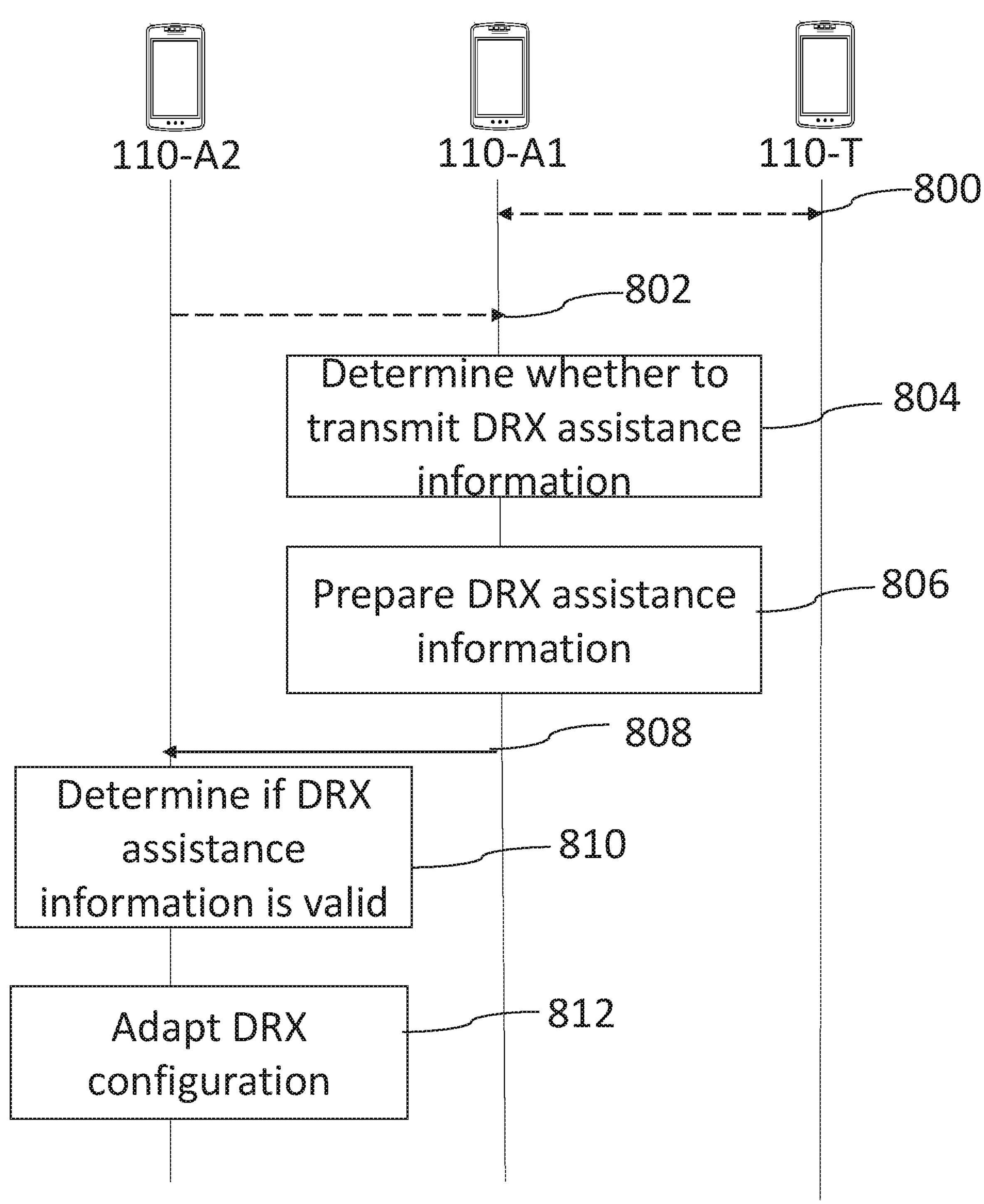
FIG. 8 shows an example signal chart.

FIG. 8 shows an example signal chart that could be used in some examples of the disclosure. In this example the signals are exchanged between the first candidate anchor UE 110-A1 and a target UE 110-T and a second candidate anchor UE 110-A2.

At block 800 the first anchor UE 110-A1 can be participating in an SL positioning session with a target UE 110-T. As the first anchor UE 110-A1 is participating in an SL positioning session with a target UE 110-T the first anchor UE 110-A1 is aware of the SL positioning requirements and/or the UE type of the target UE 110-T and/or any other information that indicates a DRX configuration of the target UE 110-T.

In some examples the first anchor UE 110-A1 can be aware of the SL positioning requirements and/or the UE type of the target UE 110-T and/or any other information that indicates a DRX configuration of the target UE 110-T without being in an SL positioning session with the target UE 110-T. For instance, the first anchor UE 110-A1 can learn such information based in an SL positioning request from the target UE 110-T even if the first anchor UE 110-A1 has rejected that request. In some examples the first anchor UE 110-A1 can learn such information be means of UE implementation or by any other suitable means.

At block 802 the second anchor UE 110-A2 can transmit a DRX assistance request message to the first anchor UE 110-A2.

The DRX assistance request can comprise any suitable information. In some examples the DRX assistance request can comprise:

- Current DRX configuration of the second anchor UE 110-A2
- Mobility pattern of the second anchor UE 110-A2 (the mobility pattern can comprise speed vector, trajectory, route information, or any other suitable information)
- DRX configuration that is to be used for response (so that the first anchor UE 110-A1 can respond to the second anchor UE 110-A2 when the second anchor UE 110-A2 is awake)—this information element is not needed if DRX configuration for response is same as current DRX
- An indication of the DRX configurations that the second anchor UE 110-A2 can support (this information can be included in scenarios where the first anchor UE 110-A1 is made to select the DRX configuration for the second anchor UE 110-A2)
- Information indicative of a DRX format:
- Information indicative of trigger conditions for DRX assistance.

The information indicative of a DRX format can comprise information such as UE type or a DRX class or a DRXP class. In some examples the second anchor UE 110-A2 can indicate the type of one or more UEs 110 within the vicinity of the second anchor UE 110-A2. The information indicating the type of UEs within the vicinity can be provided as per the information granularity needed for DRX assistance. The information granularity needed for DRX assistance can be either:

- UE type of the target UE 110-T that requires most stringent DRX or DRXP (The target UE 110-T with the most stringent DRX will have the shortest DRX OR
- UE type or required DRX associated with each target UE 110-T The trigger conditions can be evaluated by the first anchor UE 110-A1. The information indicative of a the trigger condition can comprise): the current DRX configuration of the second anchor UE 110-A2 not being able to meet the SL positioning requirement of target UEs 110-T that are in the vicinity of the first anchor UE 110-A1; The current DRX configuration of the second anchor UE 110-A2 resulting in inefficient power saving considering the UE type of target UEs 110-T in the vicinity of the first anchor UE 110-A1 or any other suitable conditions.

The DRX assistance request can be sent at any suitable occasion. In some examples the second anchor UE 110-A2 can be configured to send the DRX assistance request periodically. For instance, the second anchor UE 110-A2 can be configured to autonomously determine to send the request based on UE 110 implementation. In such cases the second anchor UE 110-A2 can broadcast the DRX assistance request.

In some examples the second anchor UE 110-A2 can be configured to transmit the DRX assistance request when the second anchor UE 110-A2 is within a given geographical area. The network 100 or neighboring UE 110 or any other suitable entity can be used to configure the second anchor UE 110-A2 to transit the DRX information request. In this case the network, or other suitable entity, can anticipate the movements of the UEs 110 within the respective areas.

The DRX assistance request can be sent from the second anchor UE 110-A2 to any suitable entity. In some examples the DRX assistance request can be broadcast from the second anchor UE 110-A2 to all nearby anchor UEs 110-A. In some examples the DRX assistance request can be can be unicast or groupcast from the second anchor UE 110-2 to certain anchor UEs 110-A if the second anchor UE 110-A2 is aware of the presence of the anchor UE(s). In some examples a default DRXP class can be defined to send the DRX assistance request where other anchor UES 110-A are monitoring for the request message.

At block 804 the first anchor UE 110-A1 determines whether to transmit the DRX assistance information. In examples where a DRX assistance request is received from the second anchor UE 110-A2 the first anchor UE 110-A1 can determine whether to transmit the DRX assistance information based on the received DRX assistance request. In some examples the first anchor UE 110-A2 can autonomously determine to transmit the DRX assistance information without receiving any requests for it.

In some examples the first anchor UE 110-A1 can be configured to transmit the DRX assistance information when the first anchor UE 110-A1 is in a particular zone or geographic area. The network 100, one or more neighboring UEs 110 or any other suitable entity can configured to first anchor UE 110-A1 to transmit the DRX assistance information when the first anchor UE 110-A1 is in a particular zone or geographic area. will determine whether to transmit the DRX assistance information based on. In such cases the network 100 or the neighboring UEs 110 or any other suitable entity can have anticipated the movements and future positions of the respective UEs 110 and can have identified a need for a good trade-off between the availability of the anchors UEs 110-A and power saving of the UEs 110.

In some examples the first anchor UE 110-A1 can be configured to transmit the DRX assistance information in response to receiving the DRX assistance request from the second anchor UE 110-A2. The first anchor UE 110-A1 can be configured to always transmit the DRX assistance information in response to the requests. In some examples the first anchor UE 110-A1 can be configured to only provided the DRX assistance information if it is expected that the second anchor UE 110-A2 will move into the area in which the first anchor UE 110-A2 is currently located. In some examples the first anchor UE 110-A1 can be configured to only provided the DRX assistance information if there is a high similarity in the mobility patterns or the respective anchor UEs 110-A1, 110-A2. In some examples the first anchor UE 110-A1 can be configured to only provided the DRX assistance information if any of the trigger conditions indicated in the DRX assistance request is met. In some examples the trigger conditions do not need to be indicated in the DRX assistance request but could be provided by the network 100, a neighboring UE 110, or any other suitable entity.

In some examples the first anchor UE 110-A1 can be configured to only provided the DRX assistance information if there are no other anchor UEs 110-A2 identified or found in the vicinity of the first anchor UE 110-A1. In such cases the first anchor UE 110-A1 can determine to provide the DRX assistance in the expectation that any second anchor UE 110-A2 that is incoming to the vicinity can benefit from the DRX assistance information. In this example the range of the DRX assistance signal is assumed to be larger that the (pre-)configured distance used for evaluation). In such cases, SL-RSRP like signal strength measurement can be used instead of distance measurements.

If there are a high number of anchor UEs 110-A in the vicinity of the first anchor UE 110-A1 then the first anchor UE 110 will determine not to provide the DRX assistance information. For example, if the density of anchor UEs 110-A is above a UE density threshold then the first anchor UE 110 will determine not to provide the DRX assistance information. The UE density threshold can be configured by the network 100, by neighboring UEs 110 or by any other suitable entity. The density of the anchor UEs 110A can be calculated by the first anchor UE 110-A1 by monitoring SCIs that originate from other anchor UEs 110-A2.

At block 806 the first anchor UE 110-A2 prepares the DRX assistance information. The DRX assistance information can be prepared based, at least in part, on the DRX assistance request in examples where a DRX assistance request has been received. The DRX assistance information can be prepared based, at least in part on the type of UEs 110 in the vicinity of the first anchor UE 110-A2 if a positive determination has been made at block 804.

In some examples the first anchor UE 110-A1 might need to provide a recommendation on DRX configuration for the second anchor UE 110-A2. In such cases the first anchor UE 110-A1 might determine the most suitable DRX configuration for the identified types of UE 110 in the vicinity that would maximize power saving at the second anchor UE 110-A2 and yet to allow the second anchor UE 110-A2 to provide support to the target UEs 110-T in SL positioning.

Any suitable means or processes can be used to identify the types of UEs 110 that are in the vicinity of the first anchor UE 110-A1. In some examples the first anchor UE 110-A1 might identify the positioning requirements or a UE type for the target UEs 110-T based on discovery like SL positioning session request messages. In some examples the first anchor UE 110-A1 might identify the positioning requirements or a UE type for the target UEs 110-T based on overhearing an ongoing SL positioning session involving the relevant target UEs 110-T. In such cases the first anchor UE 110-A1 could over hear an SCI or any other suitable signals.

In some examples the second anchor UE 110-A2 could have UE implementation-based determination of UE type of target UEs 110-T present in the vicinity.

The DRX assistance information can be prepared into any suitable format. In some examples the first anchor UE 110-A1 might be configured to prepare the DRX assistance information in accordance with a format indicated in a DRX assistance request. The format indicated in the DRX assistance request can comprise information that is needed and information granularity IEs and any other suitable requirements.

In some examples the format of the DRX assistance information could be configured or pre-configured by the network. In such cases the format could be area dependent so that different areas can use different formats.

In some examples the first anchor UE 110-A1 can autonomously determine the format of DRX assistance information without the need for an explicit indication.

At block 808 the DRX assistance information is sent from the first anchor UE 110-A1 to the second anchor UE 110-A2. The DRX assistance information can be sent in a DRX Assistance Information message or a DRXP Assistance Information message.

The DRX Assistance Information message or a DRXP Assistance Information message can comprise any suitable information. The information that is provided in the DRX Assistance Information message or a DRXP Assistance Information message can be dependent upon the type and granularity of information that has been requested.

In some examples the DRX Assistance Information message or a DRXP Assistance Information message can comprise a UE types for the target UE 110-T that requires the most stringent DRX configuration or a UE type or DRX configuration associated with respective target UEs 110-T or a DRX or DRXP recommendation. In some examples the DRX Assistance Information message or a DRXP Assistance Information message could comprise information relating to the mobility pattern of the first anchor UE 110-A1. The mobility pattern could comprise information relating to a speed vector, trajectory, route information or any other suitable information.

In some examples the first anchor UE 110-A1 could broadcast the DRX Assistance Information message or a DRXP Assistance Information message. The broadcast of the DRX Assistance Information message or a DRXP Assistance Information message could be used in cases where there has been no request for DRX assistance or if there have been many requests for DRX assistance.

In some examples the first anchor UE 110-A1 could unicast or groupcast the DRX Assistance Information message or a DRXP Assistance Information message to one or more second anchor UEs 110-A2 when there is explicit request for DRX assistance from those second anchor UEs 110-A2.

At block 810 the second anchor UE 110-A2 determines whether to adapt its DRX configuration based, at least in part, on the received DRX assistance information.

In some examples the second anchor UE 110-A2 can determine to adapt the DRX configuration only if it is anticipated that the second anchor UE 110-A2 is moving towards the zone or area of the first anchor UE 110-A1. In some examples the second anchor UE 110-A2 can determine to adapt the DRX configuration only if there is a high similarity between the mobility pattern of the first anchor UE 110-A1 and the mobility pattern of the second anchor UE 110-A2.

In some examples the second anchor UE 110-A2 can determine to adapt the DRX configuration based on a geographical area or zone. In some examples the network 100 could configure or preconfigure areas where the second anchor UE 110-A2 is to adapt its DRX configuration when it receives the DRX assistance information from the first anchor UE 110-A1. In such cases the network 100 could have anticipated the movement of one or more of the UEs 110 or UE types within the respective areas and so could determine the need for a good trade-off between availability of the anchor UEs 110-A and UE 110 power saving.

In some cases it can be assumed that the DRX information is always useful or relevant. In such cases the second anchor UE 110-A2 can determine to adapt the DRX configuration whenever it receives DRX assistance information and the recommended or suitable DRX configuration is different from its current DRX configuration.

In some examples the second anchor UE 110-A2 can have UE implementation-based determination of whether or not to adapt its DRX based at least on the received DRX assistance information.

At block 812, if a positive determination has been made at block 810, the second anchor UE 110-A2 adapts its DRX configuration. The second anchor UE 110-A2 can choose the most appropriate DRX configuration that provides the best trade-off between its power saving and the availability of the second anchor UE 110-A2 when it is in the vicinity of the first anchor UE 110-A2. The most appropriate DRX configuration can be selected based on the types of UEs 110 in the vicinity of the first anchor UE 110A-1, the DRX configuration associated with target UEs 110-T in the vicinity of the first anchor UE 110A-1, the DRX recommendation by the first anchor UE 110A-1, and/or any other suitable information.

In some examples the second anchor UE 110-A2 can receive multiple different sets of DRX assistance information. The different sets of DRX assistance information could be received from different first anchor UEs 110-A1. In such cases the second anchor UE 110-A2 will select a DRX configuration that has the most conservative configuration. For example, it can select the DRX configuration with the longest ON cycle and the shortest OFF cycle that is suitable for all target UEs 110-T in the vicinity of the first anchor UE 110-A1. A DRX cycle can be suitable for a target UE 110-T if it enables the latency and accuracy requirements of the target UE 110-T to be met.

Examples of the disclosure therefore provide the benefit that it enables the anchor UEs 110-A to find a good trade-off between power saving for the anchor UEs 110-A and availability of the anchor UEs 110-A in a given geographical area. Examples of the disclosure can enable anchor UEs 110-A to maximize, or substantially maximize, their power saving by means of selecting an appropriate SL DRX configuration for SL positioning while ensuring that enough candidate anchor UEs 110-A are available to respond to the target UEs' 110-T SL positioning requests (or to meet positioning requirements of the target UEs) in the vicinity.

Figure 9:
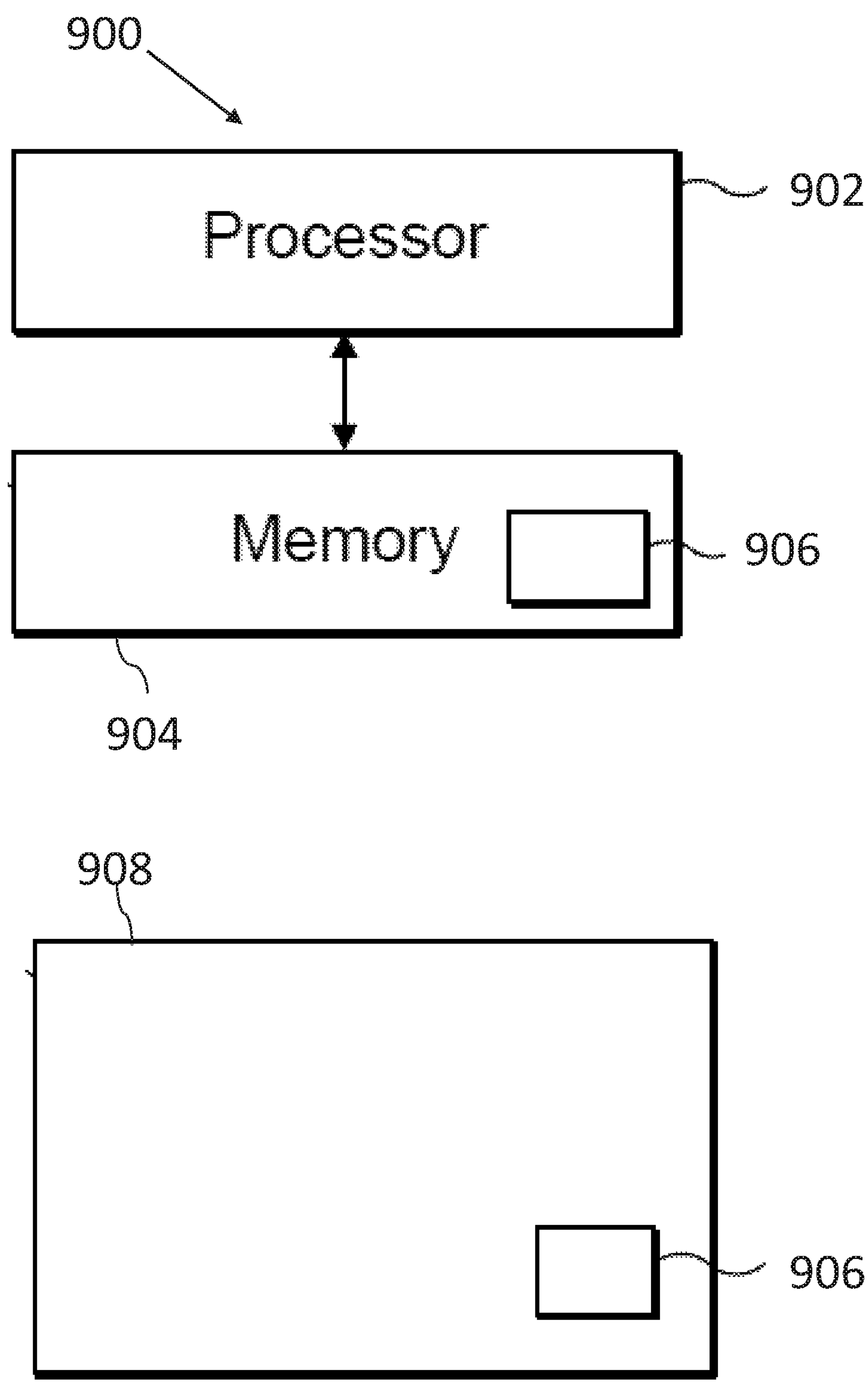
FIG. 9 shows an example controller.

FIG. 9 illustrates an example of a controller 900. The controller 900 could be provided within terminal device such as a UE 110. Implementation of a controller 900 may be as controller circuitry. The controller 900 may be implemented in hardware alone, have certain aspects in software including firmware alone or can be a combination of hardware and software (including firmware).

As illustrated in FIG. 9 the controller 900 can be implemented using instructions that enable hardware functionality, for example, by using executable instructions of a computer program in a general-purpose or special-purpose processor 902 that may be stored on a computer readable storage medium (disk, memory etc.) to be executed by such a processor 902.

The processor 902 is configured to read from and write to the memory 904. The processor 902 may also comprise an output interface via which data and/or commands are output by the processor 902 and an input interface via which data and/or commands are input to the processor 902.

The memory 904 stores a computer program comprising computer program instructions 906 (computer program code) that controls the operation of the apparatus when loaded into the processor 902. The computer program instructions, of the computer program, provide the logic and routines that enables the apparatus to perform the methods illustrated in the Figs. The processor 902 by reading the memory 904 is able to load and execute the computer program.

In examples where the controller 900 is provided within a device for providing anchor capabilities the controller 900 comprises: at least one processor 902; and at least one memory 904 storing instructions that, when executed by the at least one processor 902, cause the device at least to perform:

determining 600 Discontinuous Reception (DRX) assistance information for sidelink positioning wherein the DRX assistance information comprises information indicative of a DRX configuration information for one or more target UEs; and enabling 602 transmission of the DRX assistance information to one or more candidate anchor UEs.

In examples where the controller 900 is provided within a candidate anchor the controller 900 comprises: at least one processor 902; and at least one memory 904 storing instructions that, when executed by the at least one processor 902, cause the device at least to perform:

receiving 604 Discontinuous Reception (DRX) assistance information for sidelink positioning wherein the DRX assistance information is received from another UE and the DRX assistance information comprises information indicative of a DRX configuration information for one or more target UEs.

In examples where the controller 900 is provided within a device that is to be positioned the controller 900 comprises: at least one processor 902; and at least one memory 904 storing instructions that, when executed by the at least one processor 902, cause the device at least to perform:

participating 606 as a target UE in a side link positioning session with a first anchor UE using a Discontinuous Reception (DRX) configuration; and continuing 608 the side-link positioning session with a second anchor UE using the same DRX configuration.

The instructions 906 may arrive at the UE 110 via any suitable delivery mechanism 908. The delivery mechanism 908 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the instructions 906. The delivery mechanism may be a signal configured to reliably transfer the instructions 906. The apparatus may propagate or transmit the instructions 906 as a computer data signal. The instructions can comprise software code or computer program code.

The computer program can comprise instructions 906 for causing a UE 110 to perform at least the following or for performing at least the following: determining 600 Discontinuous Reception (DRX) assistance information for sidelink positioning wherein the DRX assistance information comprises information indicative of a DRX configuration information for one or more target UEs; and enabling 602 transmission of the DRX assistance information to one or more candidate anchor UEs.

The computer program can comprise instructions 906 for causing a UE 110 to perform at least the following or for performing at least the following:

receiving 604 Discontinuous Reception (DRX) assistance information for sidelink positioning wherein the DRX assistance information is received from another UE and the DRX assistance information comprises information indicative of a DRX configuration information for one or more target UEs.

The computer program can comprise instructions 906 for causing a UE 110 to perform at least the following or for performing at least the following:

participating 606 as a target UE in a side link positioning session with a first anchor UE using a Discontinuous Reception (DRX) configuration; and continuing 608 the side-link positioning session with a second anchor UE using the same DRX configuration.

The computer program instructions may be comprised in a computer program, a non-transitory computer readable medium, a computer program product, a machine-readable medium. In some but not necessarily all examples, the computer program instructions may be distributed over more than one computer program.

Although the memory 904 is illustrated as a single component/circuitry it may be implemented as one or more separate components/circuitry some or all of which may be integrated/removable and/or may provide permanent/semi-permanent/dynamic/cached storage.

Although the processor 902 is illustrated as a single component/circuitry it may be implemented as one or more separate components/circuitry some or all of which may be integrated/removable. The processor 902 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in FIGS. 3 to 8 can represent steps in a method and/or sections of code in the computer program. The illustration of a particular order to the blocks does not necessarily imply that there is a required or preferred order for the blocks and the order and arrangement of the block may be varied. Furthermore, it can be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

What is claimed is:

1. A candidate anchor user equipment (UE) comprising:
at least one processor; and
at least one memory storing instructions which when executed by the at least one processor cause the candidate anchor UE at least to perform:
receiving, from another UE that is participating or has participated in a sidelink positioning session with one or more target UEs, Discontinuous Reception (DRX) assistance information for sidelink positioning, wherein the DRX assistance information comprises information indicative of DRX configuration information for the one or more target UEs.

2. The candidate anchor UE as claimed in claim 1, wherein the candidate anchor UE is further caused to perform:
participating, as an anchor UE, in the sidelink positioning session with the one or more target UEs.

3. The candidate anchor UE as claimed in claim 1, wherein the candidate anchor UE is further caused to perform:
determining, based on the information indicative of the DRX configuration information, a DRX configuration to be used in the sidelink positioning session with the one or more target UEs.

4. The candidate anchor UE as claimed in claim 1, wherein the candidate anchor UE is further caused to perform:
using a DRX configuration indicated in the DRX assistance information to participate, as an anchor UE, in the sidelink positioning session with the one or more target UEs.

5. The candidate anchor UE as claimed in claim 1, wherein the candidate anchor UE is further caused to perform:
adapting a current DRX configuration used for the sidelink positioning based on the received DRX assistance information.

6. The candidate anchor UE as claimed in claim 1, wherein the information indicative of the DRX configuration information for at least one of the one or more target UEs comprises at least one of:
a type of the at least one of the one or more target UEs;
a DRX configuration used in the sidelink positioning session with the one or more target UEs; or
a class of the DRX configuration of the one or more target UEs.

7. The candidate anchor UE as claimed in claim 1, wherein the candidate anchor UE is further caused to perform:
enabling a request for the DRX assistance information to be transmitted from the candidate anchor UE to the another UE.

8. A target user equipment (UE) comprising:
at least one processor; and
at least one memory storing instructions which when executed by the at least one processor cause the target UE at least to perform:
participating as the target UE in a sidelink positioning session with a first anchor UE using a Discontinuous Reception (DRX) configuration; and
continuing the sidelink positioning session with a second anchor UE using the same DRX configuration.

* * * * *